(12) United States Patent
Khajavi et al.

(10) Patent No.: US 12,422,060 B2
(45) Date of Patent: Sep. 23, 2025

(54) METHOD OF LAYING A PIPELINE ON A SEAFLOOR, MONITORING SURROUNDING ZONES OF THE INSTALLED PIPELINE FOR APPROACHING VESSELS AND WARNING VESSELS CONSIDERED TO BE ABLE TO CAUSE HARM TO THE PIPELINE

(71) Applicant: FMC Kongsberg Subsea AS, Kongsberg (NO)

(72) Inventors: Mohammed Khajavi, Stabekk (NO); Tobias Sommerfelt Rønning, Stabekk (NO); Eric Waymel, Vestfossen (NO); Nicholas Riviere, Oslo (NO); Elisabeth Nøst, Kolsås (NO)

(73) Assignee: TechnipFMC Norge AS, Kongsberg (NO)

( * ) Notice: Subject to any disclaimer, the term of this patent is extended or adjusted under 35 U.S.C. 154(b) by 371 days.

(21) Appl. No.: 18/010,593

(22) PCT Filed: Jun. 22, 2021

(86) PCT No.: PCT/EP2021/066913
§ 371 (c)(1),
(2) Date: Dec. 15, 2022

(87) PCT Pub. No.: WO2021/259895
PCT Pub. Date: Dec. 30, 2021

(65) Prior Publication Data
US 2023/0313910 A1    Oct. 5, 2023

(30) Foreign Application Priority Data

Jun. 25, 2020 (NO) .................................. 20200745

(51) Int. Cl.
*F16L 1/12* (2006.01)
*F16L 1/16* (2006.01)
*G08G 3/02* (2006.01)

(52) U.S. Cl.
CPC .................. *F16L 1/123* (2013.01); *F16L 1/16* (2013.01); *G08G 3/02* (2013.01)

(58) Field of Classification Search
CPC ... F16L 1/123; F16L 1/16; G08G 3/00; G08G 3/02; G01S 13/88
See application file for complete search history.

(56) References Cited

U.S. PATENT DOCUMENTS

| 5,193,937 A | 3/1993 | Miller |
| 2013/0041523 A1 | 2/2013 | Jensen et al. |

(Continued)

FOREIGN PATENT DOCUMENTS

| CN | 101859497 B | 10/2010 |
| CN | 109633556 A | 4/2019 |

(Continued)

*Primary Examiner* — Amber R Anderson
*Assistant Examiner* — Stacy N Lawson

(57) ABSTRACT

It is described a method of laying a pipeline (1) on a seafloor (2), wherein the method comprises the steps of: —bringing the pipeline to an offshore location using a vessel, —laying the pipeline on the seafloor using the vessel, —defining a first zone (10) surrounding at least a first part length (1') of the pipeline when laid subsea, wherein the first part length is uncovered, —defining a second zone (20) extending from the first zone, —monitoring the second zone for vessels approaching the first zone, —analysing vessels detected during said monitoring of the second zone, for the purpose of determining whether the vessels can cause harm to the first part length of the pipeline, —for each vessel monitored in the second zone and considered to be able to cause harm to the first part length of the pipeline, informing the vessel (Continued)

about the first zone and/or requesting the vessel not to enter into the first zone.

10 Claims, 3 Drawing Sheets

(56) References Cited

U.S. PATENT DOCUMENTS

2013/0275055 A1* 10/2013 Hansen .............. G01N 29/4436
702/34
2019/0011062 A1* 1/2019 Olsen .................. E21B 41/0007

FOREIGN PATENT DOCUMENTS

| | | | |
|---|---|---|---|
| EP | 2 635 875 B1 | 2/2017 | |
| GB | 2007598 A * | 5/1979 | ............. B63B 35/00 |
| NO | 20150666 A1 | 10/2016 | |
| WO | WO 02/02979 A1 | 1/2002 | |
| WO | WO 2011/113438 A1 | 9/2011 | |
| WO | WO 2017/070289 A1 | 4/2017 | |

* cited by examiner

METHOD OF LAYING A PIPELINE ON A SEAFLOOR, MONITORING SURROUNDING ZONES OF THE INSTALLED PIPELINE FOR APPROACHING VESSELS AND WARNING VESSELS CONSIDERED TO BE ABLE TO CAUSE HARM TO THE PIPELINE

FIELD OF THE INVENTION

The present invention relates to the field of laying and protecting subsea pipelines.

BACKGROUND OF THE INVENTION

Subsea pipelines laid on the seafloor often require some kind of protection in order to minimize the chances of damage if subject to interaction with trawl gear from fishing vessels and or anchor(s) from vessels. This is particularly important in relatively shallow waters, such as water depths up to 1000 meters.

The subsea pipelines may be a rigid pipe, a flexible pipe, a cable or an umbilical or combinations of these. The rigid and flexible pipes are used for transporting fluids, such as oil, gas, water, condensate, and any combination thereof to a surface installation such as floating vessel or an installation on shore or between offshore installations. Umbilicals are used for transporting combinations of hydraulic fluids, electrical power, gas and/or chemicals from a surface installation to a subsea structure or between offshore structures or even between subsea structures. The subsea structure may be a satellite well, a cluster of wells, a manifold, a processing unit, or another subsea unit. The surface installation can be a Floating Production Storage and Offloading (FPSO) or another floating installation.

There is therefore a need to protect the subsea pipeline to maintain its integrity during its service life. To protect the subsea infra-structure (including structures, pipelines, cables and umbilicals and other assets subsea) against potential damage from trawl gear or other vessel related activities, the current routine method is to provide physical protection to the infrastructure by means of covers or rock berms or to place the infrastructure out of harms way by means of dredging or trenching.

Examples of prior art methods to protect subsea pipelines by a protective or mechanical cover, are disclosed in U.S. Pat. No. 5,193,937A, WO2017/070289A1 and WO02/02979.

U.S. Pat. No. 5,193,937A describes a concrete or the like mattress for laying over a pipeline on the seabed. The mattress comprises an elongate recess or tunnel having an insulating material located therein. The mattress is laid over a subsea pipeline so that the pipeline is received within the insulant-containing tunnel. The pipeline is thus physically protected and thermally insulated. The mattress can comprise a plurality of concrete or like members articulated together.

WO2017/070289A1 relates to a pipe-clamping mattress for subsea pipelines. The document discusses solutions for issues relating to pipelines transporting oil and gas which pipelines may "walk" along the seafloor. These pipelines can extend over large distances. During production, these pipelines may have a tendency to move or "walk" due to thermal expansion and contraction of the pipelines resulting in possible damages to connections etc.

WO02/02979 relates to a method of stabilizing a submarine elongated structure laying on a submarine surface by laying a cover of an underwater settable material, such as a cementitious material, over and along said elongated structure.

There are however drawbacks related to the prior art solutions above, because all of the above methods are expensive as they are time-consuming, require for some methods large amount of protective material requiring rock quarries onshore, as well as they require dedicated vessels to lay or position the physical protection often along the whole length of the subsea pipeline. The physical protection laid on the seabed may damage the seabed. In addition, the prior art solutions also need physical guard vessels present around the pipeline in the period from the pipeline is positioned on the seabed until it is fully protected. In addition, the vessel(s) used in carrying out these operations emit pollution, providing an environmental impact.

There are already several known systems to monitor vessel traffic at sea. One of these systems are described in US20130041523A3 which relates to a method of avoiding damages to subsea assets by performing a survey of vessels operating above the subsea assets.

One of the objectives of this invention is to provide an alternative cheaper solution for laying and protecting subsea pipelines or parts of subsea pipelines, simplifying the subsea operation.

In particular, one of the objectives of the invention is to reduce the amount of mechanical or physical protection needed for protecting a subsea pipeline.

Another objective is to reduce the amount of trenching or dredging of the seafloor prior to laying of subsea pipelines in order to protect the subsea pipeline.

A third objective is to provide a method avoiding the use of physical guard vessels during laying and protection of a pipeline.

SUMMARY OF INVENTION

The invention is set forth in the independent claims, while the dependent claims describe other characteristics of the invention.

The invention relates to a method for installing a pipeline. The method reduces the amount of physical and mechanical protection systems needed around the pipeline, by replacing the protection related part of subsea installation work with a digital solution in which approaching vessels can be monitored while sailing in the vicinity or towards an uncovered subsea pipeline, and one may possibly communicate with the approaching vessel to avoid damages to the subsea pipeline.

A method is described of laying a pipeline on a seafloor, wherein the method comprises protecting the pipeline with at least two types of protection, and wherein the method comprises the steps of:
bringing the pipeline to an offshore location using a vessel,
laying the pipeline on the seafloor using the vessel,
defining a first zone surrounding at least a first part length of the pipeline when laid subsea, wherein the first part length is uncovered,
covering at least a second part length of the pipeline when laid subsea with a physical protection means,
defining a second zone extending from the first zone,
monitoring the second zone for vessels approaching the first zone, analysing vessels detected during said monitoring of the second zone, for the purpose of determining whether the vessels can cause harm to the first part length of the pipeline, for each vessel monitored in the second zone and considered to be able to cause harm to the first part length of the pipeline, informing the vessel about the first zone and/or requesting the vessel not to enter into the first zone.

The first zone may be defined as a vertical projection of the pipeline on the surface of the water. Alternatively, the first zone may be defined as the vertical projection of the pipeline on the surface of the water including an extension in all directions around the vertical projection. Said extension can range from a few meters and up to thousands of meters and may serve as a safety zone.

If the vessel considered to be able to cause harm to the first part length of the pipeline is a fishing vessel, the step of informing the vessel about the first zone may include information about the depth of the pipeline and that the vessel should lift the trawl above the depth of the pipeline.

Said second zone may encircle the first zone. The second zone preferably comprises the first zone.

The term uncovered with respect to a part length of the pipeline shall in this context be understood as a section of the pipeline which is not buried, nor positioned in a trench, nor covered with a physical protection etc., which is the case in the prior art solutions discussed above. In other words, an uncovered part of the pipeline resting on the seabed The physical protection means may provide a physical or mechanical protection. The laid pipeline may thus have at least two types of protection. In this regard the first part length of the pipeline and the second part length of the pipeline may be protected in accordance with the method above. The second part length of pipeline may be covered with for instance rock dump or a part of the pipeline in the vicinity of a subsea or offshore structure could be covered by conventional trawl/dropping object protection covers.

Said step of covering may comprise covering said second part length of the pipeline with rocks.

Said second part length of the pipeline may be laid at or close to an offshore installation and/or at or close to shore.

The subsea pipeline may be a fluid pipeline.

The subsea pipeline may be a cable, such as an electrical cable.

The subsea pipeline may be a combination of a fluid pipeline and a cable.

The method may comprise laying the pipeline between an offshore installation and a satellite well.

The method may comprise laying the pipeline between an offshore installation and shore.

The method may comprise laying the pipeline between an offshore installation and another offshore installation.

The second zone may extend a sufficient distance of nautical miles from a vertical projection of the pipeline on the surface of the water.

Examples of possible components, and means for performing the different steps of the method described above, are described in the following:

1) Define the area which requires protection from fishing and other vessel activities: First zone
2) Define the extended area, which allows identification of potential vessels approaching the first zone: Second zone
3) Use satellite(s) and/or other tools to monitor the activities in the second zone, and identify the potential vessel(s) approaching to the first zone based on data.

Base stations have near-real time AIS (Automatic Identification System) coverage and near perfect resolution, meaning that the latency might be seconds and at most minutes. Further, some base stations are placed at offshore installations in the North Sea, enhancing the AIS surveillance possibility. These base stations are both governmentally and privately owned. The AIS is an automatic tracking system that uses transponders on ships and is used by vessel traffic services (VTS). When satellites are used to detect AIS signatures, the term Satellite-AIS (S-AIS) is used. AIS information supplements marine radar, which continues to be the primary method of collision avoidance for water transport.

Vessels outside the coastal areas, i.e. in a sufficient distance from shore, are expected to carry AIS, i.e. there should be a very low number of vessels without AIS and other types of communication and navigation equipment. Due to the uncertainties with the vessel composition in coastal areas, alternative solutions should be limited to non-coastal areas.

For the surveillance, the field Automatic Identification System (AIS) data could be monitored through satellites, and the use of AIS Aids to Navigation (ATON)s. AIS transceivers can be equipped to a floating or fixed unit, e.g. an aid to navigation such as a buoy. Through the use of so-called virtual ATONs, that is, ATONs that appear on nearby vessels' maps but are not physical unit, the field can be marked on approaching vessels' Electronic Chart Displays (ECDIS) maps.

The AIS broadcast provides the position and purpose of an aid, such as a port or a starboard lateral buoy, even before it is physically close enough to be visible from the bridge of a ship.

AIS monitoring will allow for observation of large areas, and automatically alarms, should a vessel approach the unprotected asset(s). Further, if a vessel should come close the first zone, the AIS ATONs can transmit virtual markers, appearing on the passing vessel's ECDIS, marking the unprotected asset. This can provide enhanced situational awareness for the passing vessels, with the assets clearly marked for the vessels to navigate around.

As traffic in coastal areas include a variety of vessels with limited requirements to onboard equipment, this solution is suitable for fields further than approximately 30 nautical miles from the coast or shore. For fields closer than 30 nautical miles off the coast, traditional solutions are more suitable, as one cannot rely on the vessels carrying AIS or any communication equipment.

4) Through different tools, communicate with the approaching fleet who are in the Monitoring zone, to avoid passing and damaging the subsea infra-structure This may include, more specifically, a solution comprising a combination of the following:

Satellite phone: An approaching vessel, monitored by AIS; is contacted by satellite phone. If the satellite phone number is not available, the closest available vessel (of which the satellite number is known) is called by satellite phone by a shore-based supervisor.

Utilizing other vessels' Global Maritime and Distress Safety System (GMDSS) station: A radio operator onboard a vessel receives the name, Maritime Mobile Service Identity (MMSI) and callsign number for the approaching vessel by the shore-based supervisor. The approaching vessel is then contacts by Medium Frequency Digital Selective Calling (MF DSC) or by Very High Frequency (VHF), if within range.

AIS ATON with AIS message: The approaching vessel receives an AIS warning message and can observe the ATON (both the real and the virtual ATON) through its ECDIS, and if close enough, it can observe the real ATON by sight and radar.

For surveillance, the combination of monitoring a large area with AIS and continuous surveillance, the observation with AIS is considered to be better than today's solution of subsea intervention process.

If there is a base station coverage in the protection area, these are preferably used for communication.

Due to several fields being outside the base station coverage, one or more real AIS ATONs, e.g. a spar buoy placed in the field, with several virtual AIS ATONs marking the pipeline at the seabed, could be used. Such a buoy would be the size of a typical navigational marker. This buoy could also be equipped with a radar reflector, marking it for vessels who for some reason have turned off their AIS transponder. Additionally, with the position messages being broadcast, naval ships may also receive information about the ongoing operation even though their AIS is being operated in receiving mode only, and not transmitting mode.

An AIS transceiver located about five meters above sea level would typically have a range of approximately 10 kilometres, on average. If a constraint that no point on the subsea pipeline is included, measured vertically from the surface, is to be at least six kilometres within AIS coverage, one would need a real AIS ATON approximately every 14th kilometre. This would give at least 10 minutes for a ship/vessel traveling at 20 knots to be notified of the ATONs and 20 minutes for a ship/vessel traveling at 10 knots, and 40 minutes for a ship/vessel traveling at 5 knots, i.e. sufficient time to make a navigational manoeuvre to avoid the area around the pipeline in the first zone.

Multiple virtual ATONs could be placed anywhere inside this AIS coverage area from the real ATONs.

Summarized, the invention described herein may have at least some of the following main benefits or advantages compared to prior art solutions:

The damage to the seabed and marine environment due to subsea intervention by trenching, dredging or rock-dumping to the seabed will be eliminated.

Reducing direct pollution and carbon footprint of a typical subsea installation project.

Reducing the risk of health and safety of people engaged in subsea project. Less people need to work offshore.

Reducing the CAPEX required for Subsea Project Installation; enhance the timeline to reach to first oil for a typical oil and gas subsea project.

Reducing the complexity and timeline: The solution will be less complex, due to less scope during subsea installation period, and shorter project time of a typical subsea oil and gas project.

These and other embodiments of the present invention will be apparent from the attached drawings, where:

DETAILED DESCRIPTION OF A PREFERENTIAL FORM OF EMBODIMENT

Figure 1A:
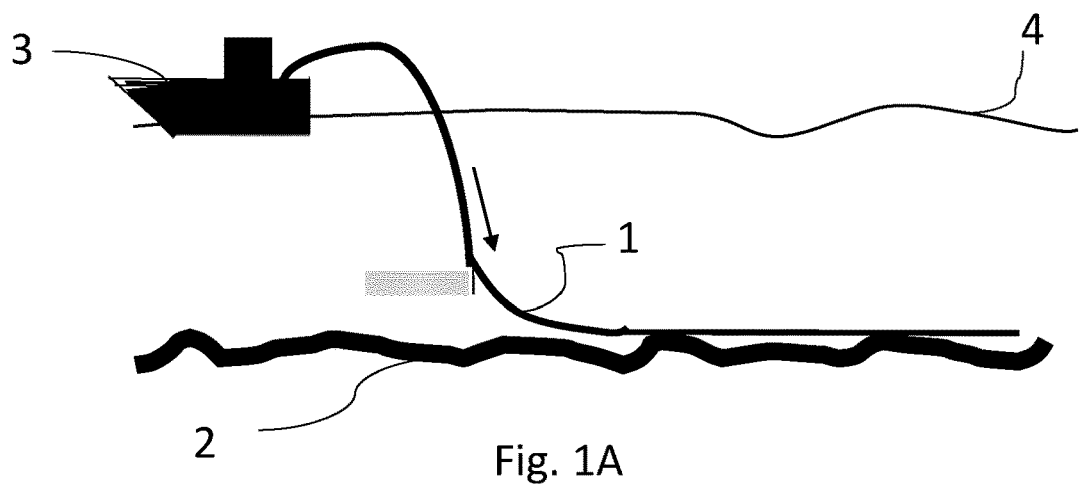
FIG. 1A is a side view of a vessel laying a subsea pipeline laying on a seafloor.

In the following, embodiments of the invention will be discussed in more detail with reference to the appended drawings. It should be understood, however, that the drawings are not intended to limit the invention to the subject-matter depicted in the drawings.

FIG. 1A is a side view of a vessel 3 laying a subsea pipeline 1 on a seafloor 2. The vessel 3 moves on a surface 4 of water. The vessel 3 can be any pipe-laying vessel 3. Such pipe-laying vessels 3 are known to the skilled person and will not be further described herein.

Figure 1B:
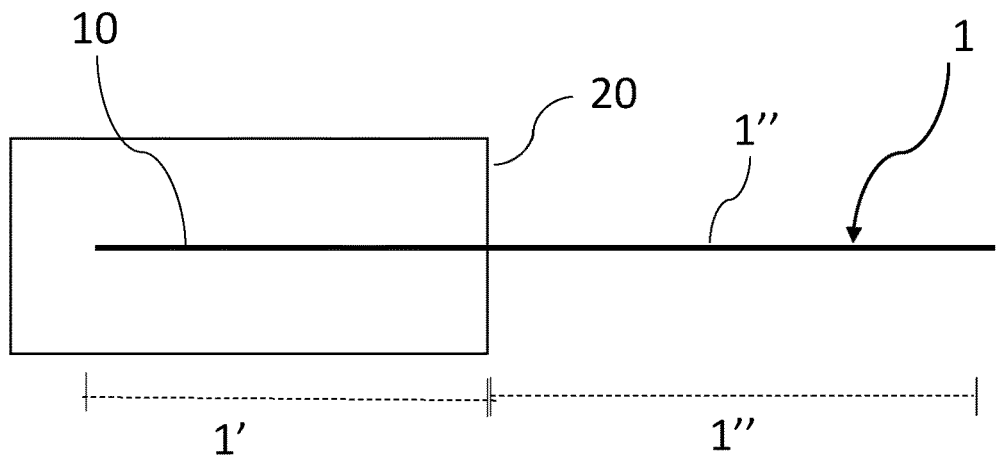
FIG. 1B is a top view of a pipeline on a seafloor, where a first part length of the pipeline corresponds to a first zone, and where a second zone extends from the first zone.

FIG. 1B is a top view of a pipeline 1 on a seafloor. The pipeline 1 is divided in a first part length of the pipeline 1' and a second part length of pipeline 1". The first part length of the pipeline 1' corresponds to a first zone 10. I.e. the first zone is the vertical projection of the first part length of the pipeline 1' on the water surface. The first part length of pipeline 1' is at a depth were protection is required in order to avoid trawls and or anchors from vessels which can damage the pipeline. However, the first part length of pipeline 1' is uncovered and is rather protected by monitoring vessels entering a second zone, which second zone 20 extends from the first zone 10. In the example of FIG. 1B, the second zone 20 encloses the first zone 10. The second zone 20 is monitored 20 for vessels approaching the first zone 10, and the vessels detected during said monitoring of the second zone 20 are analysed for the purpose of determining whether the vessels 20 can cause harm to the first part length of the pipeline 1'. Each vessel monitored in the second zone 20 and considered to be able to cause harm to the first part length of the pipeline 1' is informed about the first zone 1' and/or it is requested that the vessel does not to enter into the first zone 1'.

Figure 1C:
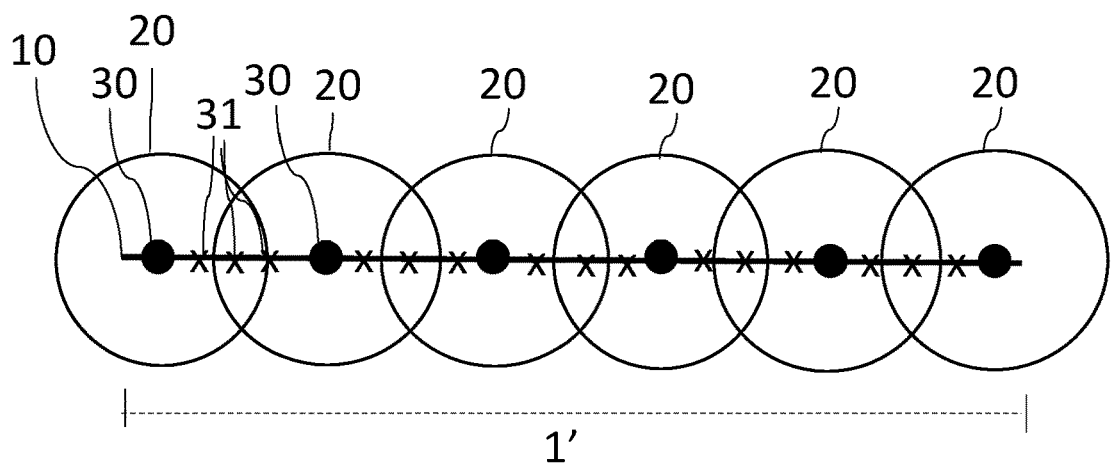
FIG. 1C is a top view of an uncovered first part length of a pipeline on a seafloor, where there are arranged six real AIS ATONs along the first part length of a pipeline and virtual AIS ATONs in between the real AIS ATONs, where the circles indicate a coverage area of the real AIS ATONs which coverage area represents the second zone.

FIG. 1C is a top view of an uncovered first part length of a pipeline 1' on a seafloor. This first part length of pipeline 1' is similar to the first part length of pipeline 1' in FIG. 1B at a depth were protection is required in order to avoid trawls and or anchors from vessels which can damage the pipeline. In the example of FIG. 1C, six real AIS ATONs 30 are arranged along the first part length of a pipeline 1' and virtual AIS ATONs 31 are arranged in between the real AIS ATONs 30. The circles indicate a coverage area of the real AIS ATONs 30, which coverage area represents the monitored second zone 20.

The real AIS ATONS 30 may be positioned on a spar buoy placed in the field, with several virtual AIS ATONs 31 marking the first part length of the pipeline 1' at the seafloor. Such a buoy would be the size of a typical navigational marker. This buoy could also be equipped with a radar reflector, marking it for vessels who for some reason have turned off their AIS transponder. Additionally, with the position messages being broadcast, naval ships may also receive information about the ongoing operation even though their AIS is in turned to receiving mode only, and not transmitting mode.

Figure 2A:
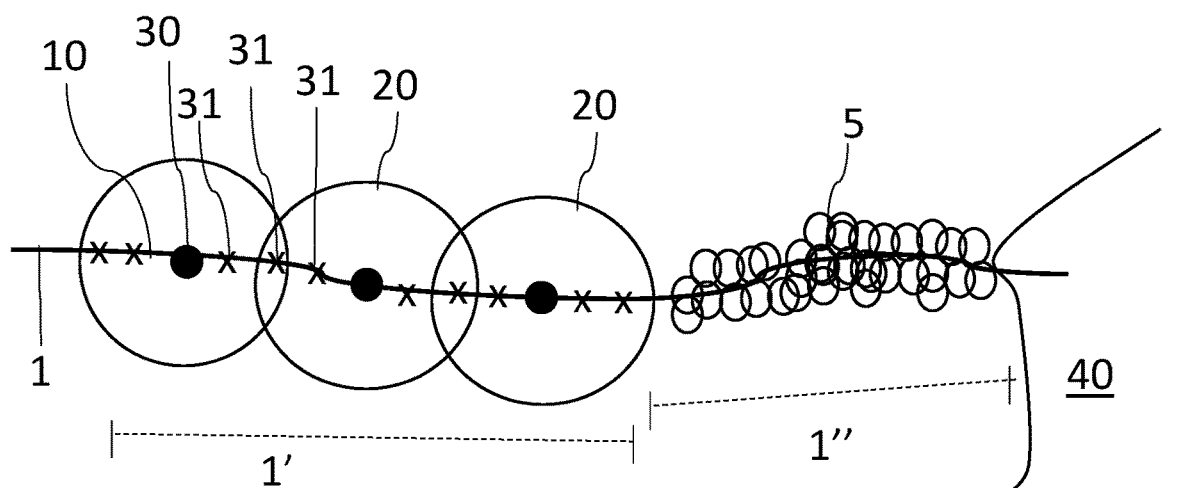
FIG. 2A is a top view of a subsea laid pipeline extending from a subsea location to a position on shore, where the pipeline is divided in an uncovered first part length of pipeline protected by real AIS ATONs and virtual AIS ATONs at a part of the pipeline farthest away from shore and a covered second part length of the pipeline closest to shore, where the cover is formed by rocks.

FIG. 2A is a top view of a subsea laid pipeline 1 extending from a subsea location to a position on shore 40. The pipeline 1 is divided in an uncovered first part length of pipeline 1' virtually protected by real AIS ATONs 30 and virtual AIS ATONs 31 at a part of the pipeline 1 farthest away from shore 40 and a covered second part length of the pipeline 1" closest to shore 40. The cover is formed by rocks 5.

Figure 2B:
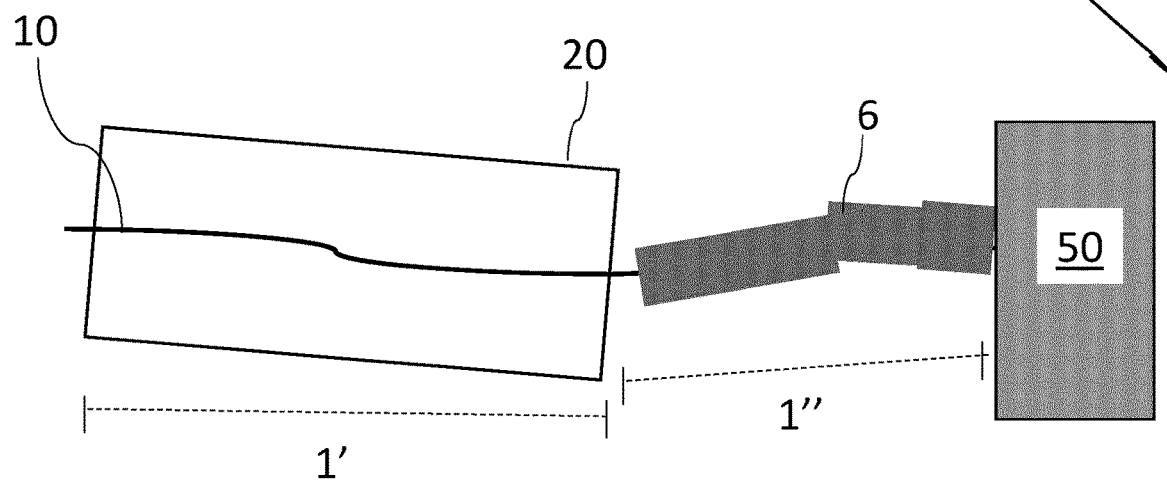
FIG. 2B is a top view of a subsea laid pipeline extending from a subsea location to a subsea installation, where the pipeline is divided in an uncovered first part length of pipeline at a part of the pipeline farthest away from the subsea installation and a covered second part length of the pipeline closest to the subsea installation, where the cover is formed by a protective structure.

FIG. 2B is a top view of a subsea laid pipeline 1 extending from a subsea location to a subsea installation 50. The pipeline 1 is divided in an uncovered first part length of pipeline 1' at a part of the pipeline farthest away from the subsea installation 50 and a covered second part length of the pipeline 1" closest to the subsea installation 50. The cover is formed by a protective structure 6.

Figure 2C:
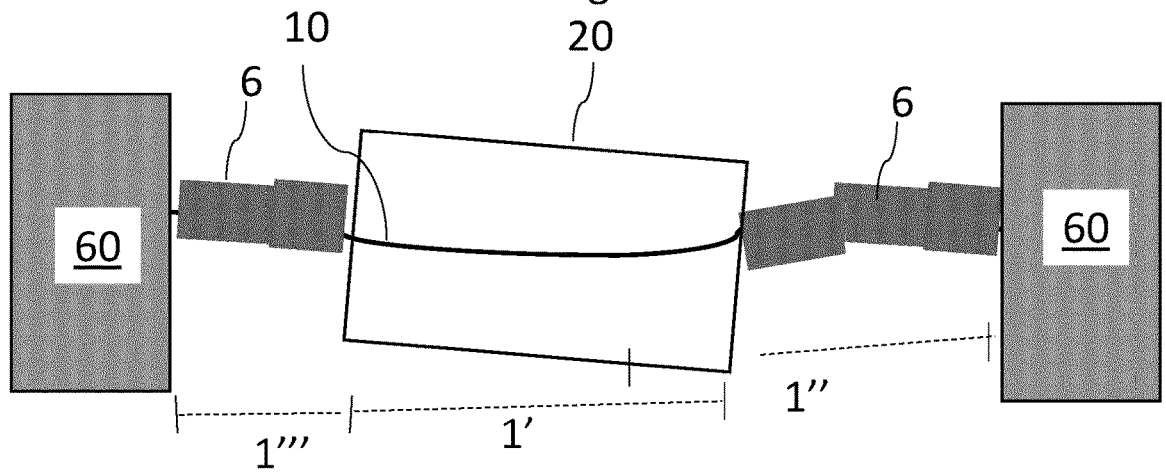
FIG. 2C is a top view of a subsea laid pipeline extending between two offshore installations, where the pipeline is divided in an uncovered first part length of pipeline between two covered part lengths of the pipeline closest to the offshore installations, where the covers are formed by a protective structure.

FIG. 2C is a top view of a subsea laid pipeline 1 extending between two offshore installations 60. The pipeline 1 is divided in a first part length of pipeline 1', a second part length of pipeline 1" and a third part length of pipeline 1'''. The second and third part lengths of pipeline are closest to the offshore installations 60 and are both covered by a protective structure 6. The first part length of pipeline 1' which is arranged between the second and third part lengths of pipeline 1", 1''' is uncovered.

Figure 3:
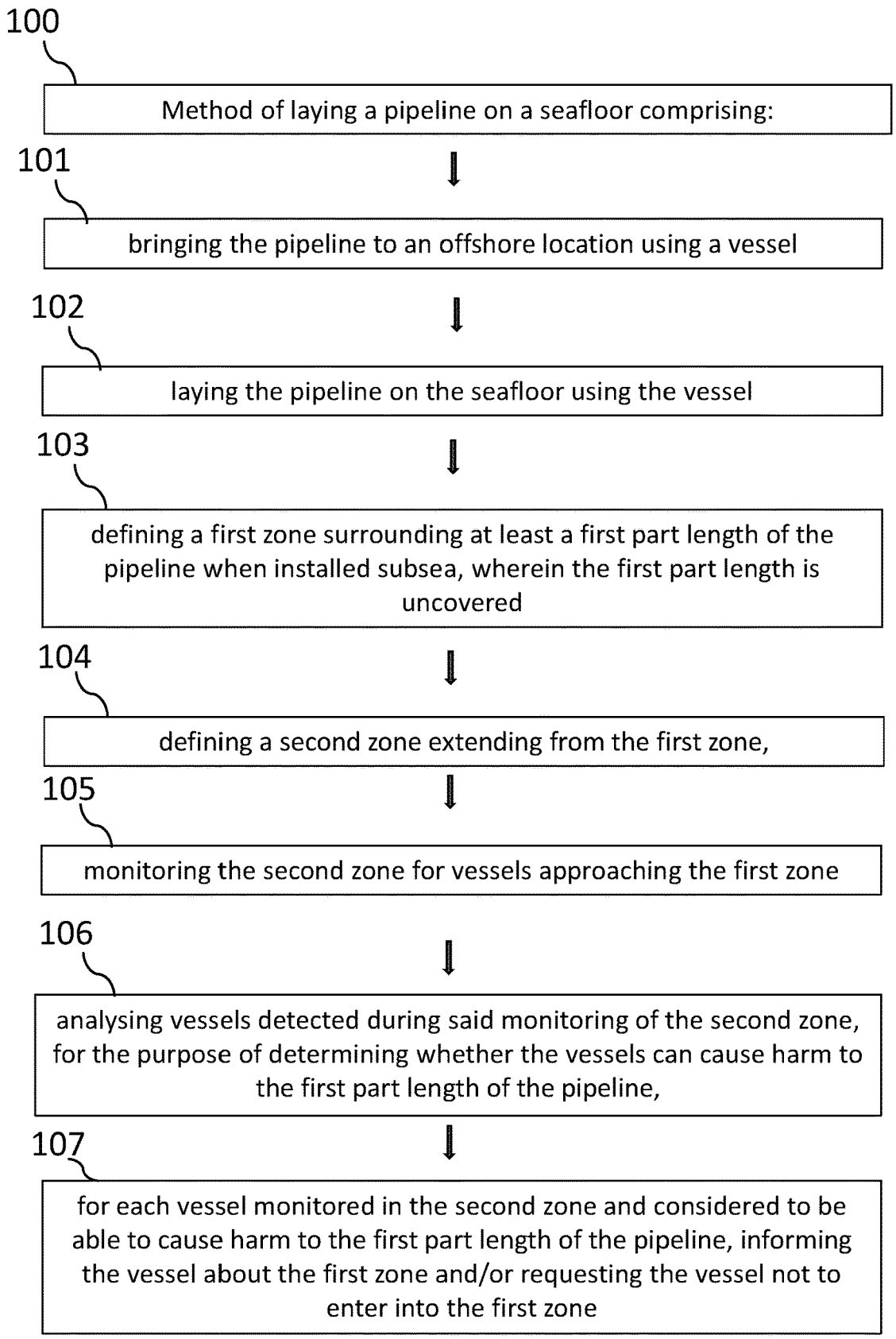
FIG. 3 shows a sequence of laying a pipeline on a seafloor according to the present invention.

FIG. 3 shows a possible sequence of a method of laying a pipeline on a seafloor according to the present invention (reference 100), defined by the steps of:
101. bringing the pipeline to an offshore location using a vessel,
102. laying the pipeline on the seafloor using the vessel,
103. defining a first zone surrounding at least a first part length of the pipeline when laid subsea, wherein the first part length is uncovered,
104. defining a second zone extending from the first zone,
105. monitoring the second zone for vessels approaching the first zone,
106. analysing vessels detected during said monitoring of the second zone, for the purpose of determining whether the vessels can cause harm to the first part length of the pipeline,
107. for each vessel monitored in the second zone and considered to be able to cause harm to the first part length of the pipeline, informing the vessel about the first zone and/or requesting the vessel not to enter into the first zone. Common for all of the examples in the Figures is the first part length of pipeline 1' which is at a depth were protection is required in order to avoid trawls and or anchors from vessels which can damage the pipeline. However, instead of protecting the laid first part length of pipeline 1', the first part length of pipeline 1' is uncovered and is rather protected by monitoring vessels entering the second zone 20. Each vessel monitored in the second zone 20 and considered to be able to cause harm to the first part length of the pipeline 1' is informed about the first zone 10 and/or requested not to enter into the first zone 10. The means of monitoring and informing may vary dependent on the requirements in the specific projects, and may include but are not limited to the examples above: real and virtual AIS ATONS, S-AIS, AIS message, radar, visual inspection (camera), satellite phone, GMDSS, MF DSC, VHF and ECDIS etc.

The invention is now explained with reference to non-limiting embodiments. However, a skilled person will understand that there may be made alterations and modifications to the embodiment that are within the scope of the invention as defined in the attached claims.

LIST OF REFERENCES

| | |
|---|---|
| 1 | Pipeline |
| 1' | First part length of pipeline |
| 1" | Second part length of pipeline |
| 1''' | Third part length of pipeline |
| 2 | Seafloor |
| 3 | Vessel |
| 4 | Surface of water |
| 5 | Rocks |
| 6 | Protective structure |
| 10 | First zone |
| 20 | Second zone |
| 30 | Real AIS |
| 31 | Virtual AIS |
| 40 | Shore |
| 50 | Subsea installation |
| 60 | Offshore installation |

The invention claimed is:

1. A method of laying a pipeline on a seafloor and protecting the pipeline with at least two types of protection, the method comprising:
   bringing the pipeline to an offshore location using a vessel;
   laying the pipeline on the seafloor using the vessel;
   defining a first zone surrounding at least a first part length of the pipeline when laid subsea, wherein the first part length is uncovered;
   covering at least a second part length of the pipeline when laid subsea with a physical protection barrier;
   defining a second zone extending from the first zone;
   leaving the second part length unmonitored;
   monitoring by use of satellites and/or other tools activities in the second zone for vessels approaching the first zone;
   analysing vessels detected during said monitoring of the second zone for the purpose of determining whether the vessels are capable of causing harm to the first part length of the pipeline; and
   for each vessel monitored in the second zone and considered to be able to cause harm to the first part length of the pipeline, informing the vessel about the first zone and/or requesting the vessel not to enter into the first zone.

2. The method according to claim 1, wherein said second zone encircles the first zone.

3. The method according to claim 1, wherein said physical protection barrier comprises rocks.

4. The method according to claim 1, wherein said second part length of the pipeline is laid at or close to an offshore installation and/or at to shore.

5. The method according to claim 1, wherein the subsea pipeline is a fluid pipeline.

6. The method according to claim 1, wherein the subsea pipeline is a cable.

7. The method according to claim 1, wherein the subsea pipeline is a combination of a fluid pipeline and a cable.

8. The method according to claim 1, wherein the method comprises laying the pipeline between an offshore installation and a satellite well.

9. The method according to claim 1, wherein the method comprises laying the pipeline between an offshore installation and shore.

10. The method according to claim 1, wherein the method comprises laying the pipeline between an offshore installation and another offshore installation.

\* \* \* \* \*